United States Patent [19]

Holzschuh et al.

[11] Patent Number: 5,419,512
[45] Date of Patent: May 30, 1995

[54] TOWED FIBER OPTIC DATA LINK PAYOUT SYSTEM

[75] Inventors: Jack E. Holzschuh, Kailua, Hi.; John D. Hightower, San Diego, Calif.

[73] Assignee: The United States of America as represented by the Secretary of the Navy, Washington, D.C.

[21] Appl. No.: 579,002

[22] Filed: Sep. 6, 1990

[51] Int. Cl.6 ............................................... F41G 7/32
[52] U.S. Cl. ................................................... 244/3.12
[58] Field of Search ......................................... 244/3.12

[56] References Cited

U.S. PATENT DOCUMENTS

| | | | |
|---|---|---|---|
| H550 | 12/1988 | Hester et al. | 73/167 |
| 3,163,711 | 12/1964 | Schindler | 244/3.12 |
| 3,319,781 | 5/1967 | Simpson et al. | 244/3.12 |
| 3,613,619 | 10/1971 | deNobel | 244/3.12 |
| 4,185,796 | 1/1980 | Riley | 244/3.12 |
| 4,573,647 | 3/1986 | Laten et al. | 244/3.12 |
| 4,770,370 | 9/1988 | Pinson | 244/3.12 |
| 4,860,968 | 8/1989 | Pinson | 244/3.12 |

Primary Examiner—Charles T. Jordan
Assistant Examiner—Christopher K. Montgomery
Attorney, Agent, or Firm—Harvey Fendelman; Thomas Glenn Keough

[57] ABSTRACT

A continuous optical data path is provided through an optical fiber extending from a launch platform to a missile. The launch platform, a surface craft, submarine or aircraft, has a tether cable connected at one end with a length of the optical fiber extending to a dynamically designed body. The dynamically designed body prevents damage of the length of optical fiber by pulling it and the tether cable beyond the structure and propulsors of the launch platform. A body spool of the optical fiber provided on the dynamically designed body pays out optical fiber as the dynamically designed body is pulled along by the launch platform and a canister spool of optical fiber on a missile canister for the missile provides the continuous optical data path as the canister is deployed from the dynamically designed body. A missile spool of the optical fiber may be included on the missile to provide the continuous data path if it is desired to launch the missile from the missile canister. The concatenated spools of optical fiber assure that failure inducing stresses are avoided as the missile and launch platform each continue on their way.

32 Claims, 3 Drawing Sheets

TOWED FIBER OPTIC DATA LINK PAYOUT SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The use of optical fibers for data transmission for remotely guided bodies has demonstrated an improved capability for a wide variety of tasks. Optical fiber spooling and deployment techniques have been developed to such an extent that a missile may be launched from a moving launch platform. Both may continue their own independent courses as fiber spools on the launch platform and the missile pay out an integral and relatively stationary interconnecting fiber. Such a technique is disclosed in the U.S. Pat. No. 4,860,968 to George T. Pinson.

However, while the Pinson approach is a noteworthy advance, the additional requirement of assuring that the optical fiber avoids entanglement with the structure of the launch platform and the launch platform's propulsors still remains unfulfilled. This limitation has been annoying, to say the least, for marine applications. The wind and water turbulence, as well as the structure and screws of the launch platform, can cause premature failure of the optical fiber. The closest arrangement for avoiding data link breakage in current use is that used for the launch of the extendable bathythermographs (XBTs). The technique for launching the XBTs is not completely relevant, however, since they are not powered, they are not dynamic platforms, they require shorter times for link continuity and they rely on a more durable wire link as opposed to the chosen optical fiber link.

Thus, a continuing need exists in the state of the art for an apparatus that provides an integral optical data path capable of surviving the launch sequence of a missile from a platform.

SUMMARY OF THE INVENTION

The present invention is directed to providing an apparatus that provides a continuous optical data path through an optical fiber extending from a launch platform to a missile. The launch platform has a tether cable connected at one end with a length of the optical fiber extending to a dynamically designed body. The dynamically designed body is appropriately shaped or fabricated with a buoyant material or a combination of both to pull the length of optical fiber beyond the structure and propulsors of the launch platform to thereby prevent damage of the length of optical fiber. A body spool of the optical fiber provided on the dynamically designed body pays out fiber as the dynamically designed body is pulled along by the launch platform. A missile canister for the missile is operatively associated with the dynamically designed body and has a canister spool of optical fiber to provide the continuous optical data path as the canister is deployed from the dynamically designed body. A missile spool of the optical fiber is provided on the missile to provide the continuous data path upon the launching of the missile from the missile canister. The tether cable and the length of optical fiber damage to the optical fiber and the concatenated spools of optical fiber assure that failure inducing stresses are avoided as the missile and launch platform continue their independent relative motions with respect to one another.

An object of the invention is to provide an improvement for the launching and control of an optically guided missile from a platform.

Another object is to provide for an improvement for an optically guided missile launched from a launch platform that may be a surface vessel, submarine or aircraft.

Another object is to provide for an improved missile launch capability from a launch platform that reduces the possibility of damage to the continuous optical fiber.

Another object is to provide for the deployment of a tether cable and a length of optical fiber coupled to a dynamically configured/ballasted body for avoiding the problems associated with entanglement with an optical fiber with structure or propulsors.

These and other objects of the invention will become more readily apparent from the ensuing specification and drawings when taken in consideration with the appended claims.

DESCRIPTION OF THE PREFERRED EMBODIMENT

Figure 1A:
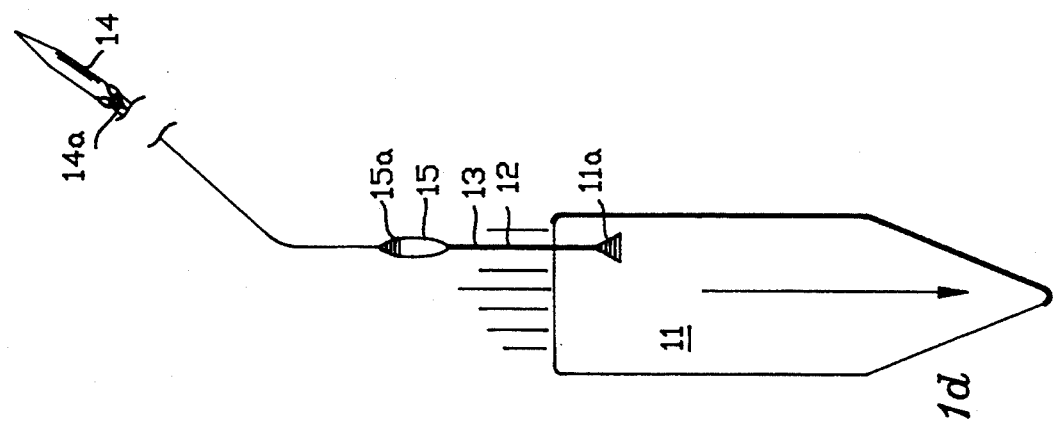
FIGS. 1a, 1b, 1c and 1d are schematical representations of the invention associated with the deployment of a missile from a surface craft launch platform.

A primary requirement for the successful payout of optical fiber data links from moving platforms is to prevent the premature failure of the optical fiber. As a consequence, the attention of designers partially has been focussed on preventing the optical fiber from moving through the medium. One solution came to light to accommodate the situation that arises when a continuous optical data path is needed between two moving platforms. Both of the platforms are independently provided with the capability to pay out optical fiber at their respective velocities. This capability has been addressed with a variety of techniques and mechanisms for the payout of an optical fiber from a seaborne craft which is coincident with and subsequent to launch of an undersea or airborne platform that is linked to the surface craft.

FIGS. 1a through 1d schematically depict a sequence showing the payout from a launch platform 11, in this case a surface craft, although an aircraft or submarine could have been depicted in this example. The sequence has launch platform 11 pay out a tow cable 12 from a platform spool 11a which also carries a length of optical fiber 13 that is continuous with the rest of the optical fiber by the airborne platform or missile 14 during launch. In the embodiment of FIGS. 1a through 1d, the tow cable and length of optical fiber are stored on platform spool 11a on the deck or on the missile launcher on launch platform 11. The towing cable and length are pulled from platform spool 11a as missile 14 is being launched so that the tow cable and length of optical fiber interconnect the moving launch platform 11 and a dynamically designed body 15.

Figure 1B:
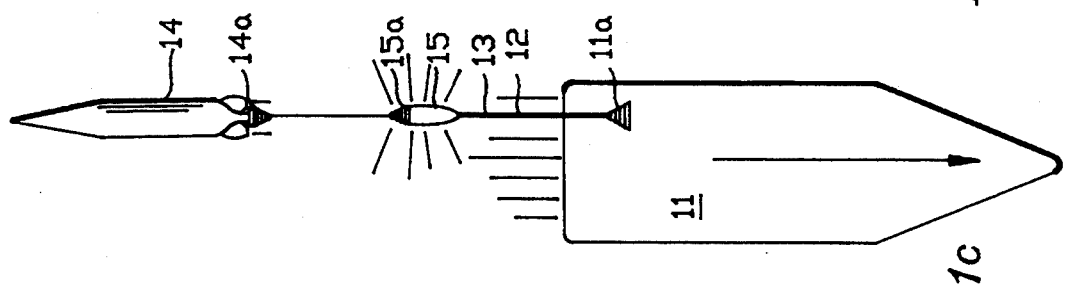
Figure 1C:
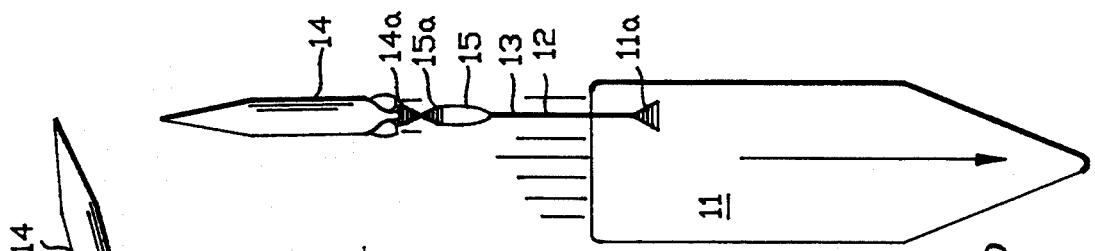

FIGS. 1a and 1b show missile 14 just after launch as it pulls tow cable 12 and length of optical fiber 13 and carries dynamically designed body 15, along with a missile payout canister spool 14a. When the end of the length of the tow cable with its associated length of optical fiber is reached, dynamically designed body 15 drops to the surface of the water and missile 14 continues on its mission, see FIG. 1c. Dynamically designed body 15 on the surface is pulled through the water by launch platform 11 via tether cable 12 and optical fiber 10 begins to be pulled from a body spool 15a and from a missile spool 14a as the missile moves toward mission completion.

Figure 1D:
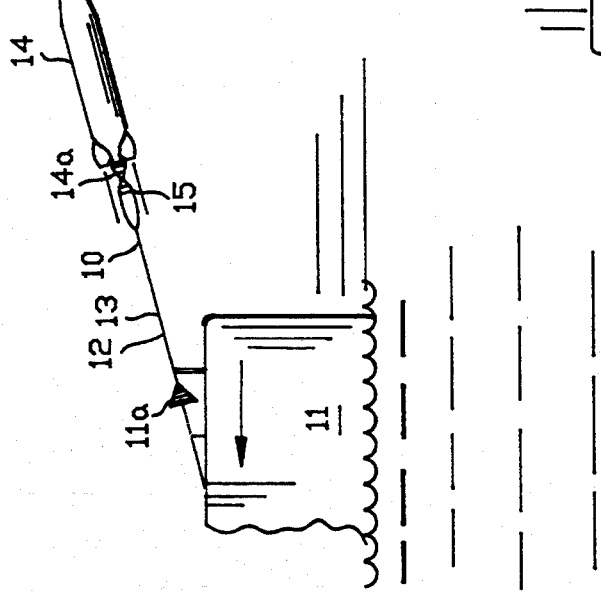

Looking to FIG. 1d, since dynamically shaped body 15 is pulled through the water by tow cable 12, it is appropriately shaped to maintain a predetermined tension to hold the tow cable and the relatively delicate length of optical fiber 13 away from the structure of launch platform or its screws. Appropriate hydrodynamic shapes are well known to assure a desired tension and direction of pull from launch platform. As a further design consideration, adequate buoyancy may by itself suffice or be provided to supplement the hydrodynamic shape, if desired. Whichever expedient is selected, the length of optical cable is held away from the structure and screws and their consequent turbulence to avoid the possibility of damaging the fiber at this interface. Furthermore, because optical fiber 10 is payed out simultaneously from body spool 15a on body 15 (which is separated a distance from launch platform 11) and from missile spool 14a on missile 14, the optical fiber is relatively stationary with respect to the moving bodies 14 and 15. The net result of this arrangement is that the possibility is greatly reduced that any damaging stresses could be created as the platform and missile independently move toward the completion of the mission.

Figure 2A:
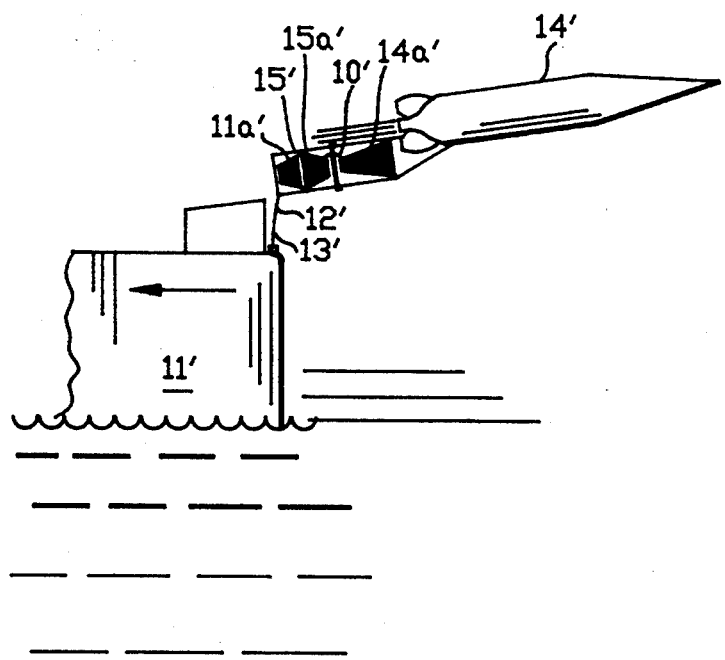
FIGS. 2a and 2b show a variation of the invention of FIG. 1 with the spools depicted in a greatly exaggerated scale with respect to the missile.
Figure 2B:
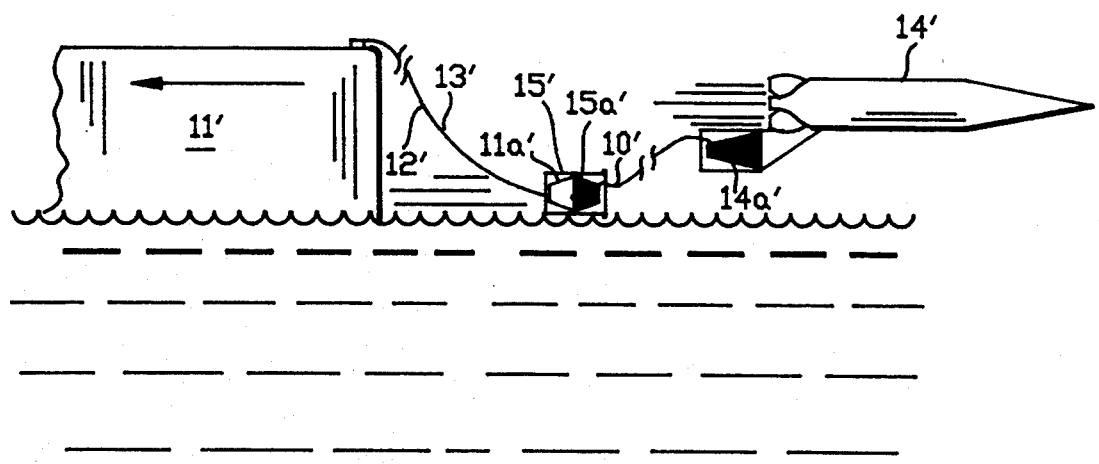

The foregoing embodiment utilizes the pulling of tether or towing cable 12 and its length of optical fiber 13 from a platform spool 11a mounted on launch platform 11. The embodiment of FIGS. 2a, and 2b, shows a launch platform 11' as an airborne platform 14' is being launched. A dynamically shaped body 15' carries a platform spool 11a' having a tether cable 12' and length 13' of optical fiber wound thereon. A body spool 15a' carries a portion of the continuously extending optical fiber 10 as does a missile spool 14a' which is carried on missile 14'.

After the missile leaves launch platform 11', see FIG. 2b, and the limit of tether cable 12' with optical fiber length 13' has been reached, dynamically designed body 15' is pulled from missile 14' by tether cable 12' and body 15' falls to the surface of the water. Since tether cable 12' mechanically links the dynamically designed body and the launch platform, the body begins to be towed through the water by tether cable 12' and part of a continuous optical data path is maintained via length 13' of the optical fiber. Another part of the continuous optical data path is provided by optical fiber 10' that is pulled from body spool 15'. Still another part of the continuous optical data path is provided by optical fiber 10' that also is pulled from missile spool 14a' as missile 14' continues to complete its mission. What may be said to be regarded as three separately identifiable lengths of fiber, length 13' pulled from platform spool 11a' and the lengths 10' of optical fiber pulled from body spool 15a' and missile spool 14a', actually are a continuous optical data path which extends from the launch platform to the missile. It is to be understood that suitable optical interconnections (not shown) could be provided where needed in the optical data path between the launch platform and the missile when, for example, a continuous integral optical fiber is not available to assure the continuous optical data link.

To restate, optical fiber 10' pulled from the body spool 15a' functions to maintain a continuous optical data path as the missile continues on its mission. Simultaneously, optical fiber 10' is payed out from missile spool 14a' and further assures the continuous optical data path through the continuously extending optical fiber irrespective that the missile 14' and the body 15' go on different paths at different rates.

Figure 3:
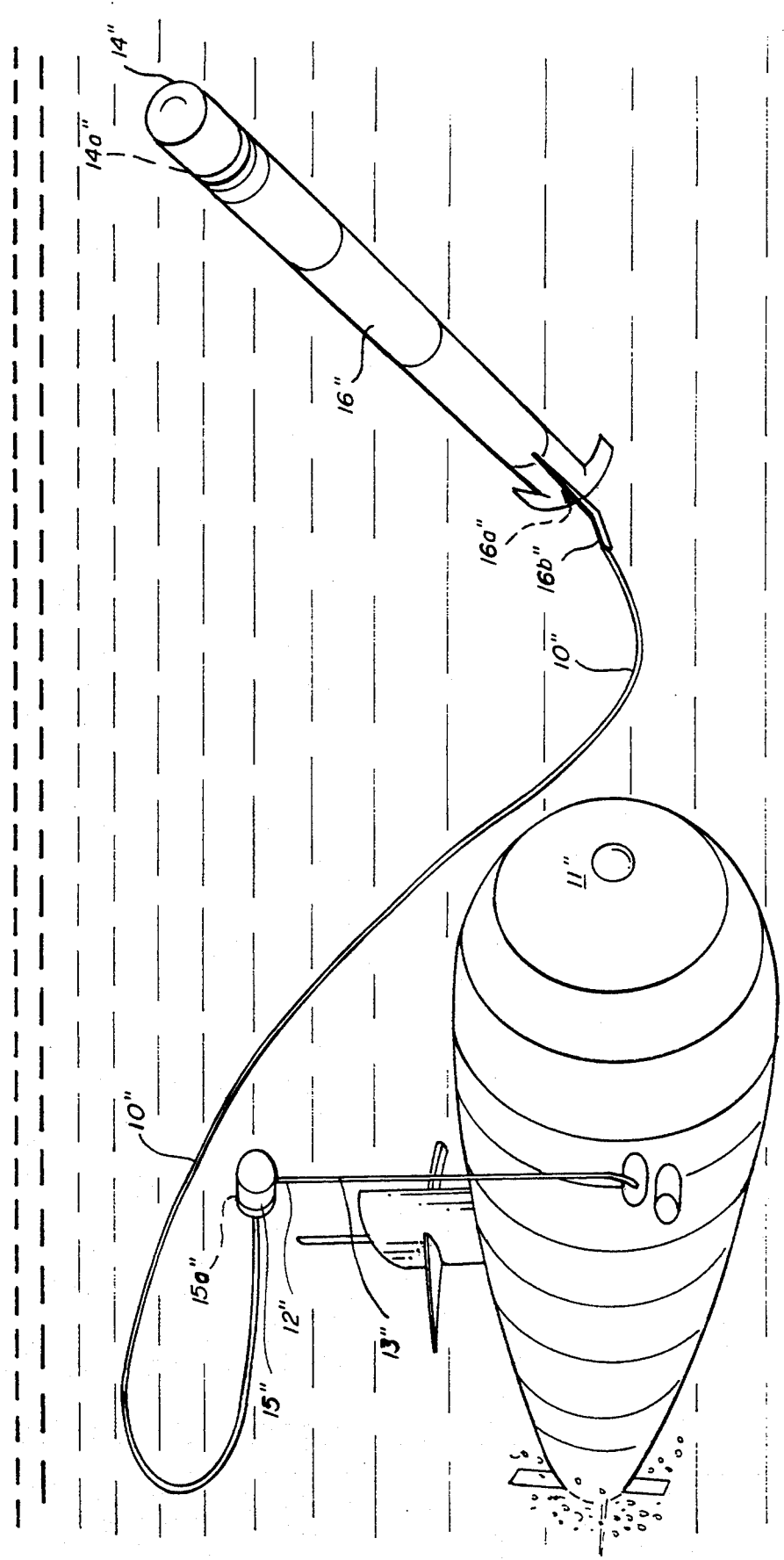
FIG. 3 is a schematical representation of the invention associated with a submarine launch platform.

Looking to FIG. 3 a deployment from a submarine 11" has a tow cable 12" with an optical fiber length 13" joined to a dynamically designed body 15". The dynamically designed body can be provided with flotation or a vane-like configuration or a combination of both to pull the tow cable and optical fiber length away from the structure or the screws of the submarine. Additionally, fiber 10" simultaneously is pulled from body spool 15a" and fiber 10" simultaneously is pulled from a missile canister spool 16a" of a missile canister 16" as it propels a missile 14" to a distant missile launch site.

A suitable feeding mechanism 16b" is provided on canister 16a" to assure that fiber 10" does not become entangled with the propulsor (such as propellers, not shown) of missile canister 16". When missile canister transports missile 14" to a desired missile launch site, missile 14" is launched in accordance with a predetermined scenario to carry out the mission. More of optical fiber 10" is pulled from a missile spool 14a" to assure the continuous optical fiber data path between the submarine and the missile. Missile 14" could be a torpedo or a rocket missile as required for a particular mission.

It also is to be understood that tether cable 12' with length 13' of optical fiber can be fabricated as a single unit with the tether cable portion including sufficient strength members to bear the load imposed by the towed dynamically designed body as well as to withstand the booster blast and associated stresses attendant the launch of the missile. The tether cable is constructed to be strong enough to withstand the drag imposed by the dynamically designed body which may be configured in the shape of a hydrofoil to pull the optical fibers away from the structure of the launch platform, the screws and their associated turbulence.

In the foregoing embodiment of this inventive concept the deployed dynamically designed body holds the optical fiber away from the launch platform via a tether cable provided with a length of optical fiber. This feature helps assure mission success since the relatively delicate optical fiber which maintains a continuous optical data path from the launch platform to the missile is taken away from the structure and propulsors of the launch platform. Such a provision avoids some of the problems associated with optical fiber guided missiles as they are launched from a moving platform since a primary cause of failure in the communication link has been avoided.

While the embodiments thusly described have concerned themselves primarily with an ocean environment, it is obvious to those skilled in the art to which this invention pertains that the launch platform could be an aircraft in place of the referred to surface craft and submarine since the structure and turbulence associated with an aircraft also are particularly hazardous to maintaining an intact optical data communication path.

Obviously, many other modifications and variations of the present invention are possible in light of the above teachings. It is therefore to be understood that within the scope of the appended claims the invention may be practiced otherwise than as specifically described.

What is claimed:

1. An apparatus providing a continuous optical data path through an optical fiber extending from a launch platform to a missile comprising:
   a tether cable connected to said launch platform at one end thereof having a length of said optical fiber to provide said continuous optical data path;
   a dynamically-designed body connected to the other end of said tether cable having a body spool of said optical fiber mounted thereon to provide said continuous optical data path;
   a missile canister for said missile operatively associated with said dynamically-designed body having a canister spool of said optical fiber to provide said continuous optical data path.

2. An apparatus according to claim 1 in which said tether cable is sufficiently lengthened to reach beyond structure and propulsors of said launch platform to prevent damage to said length of said optical fiber.

3. An apparatus according to claim 2 in which said launch platform is a surface craft.

4. An apparatus according to claim 3 in which said missile canister is provided with a propulsor means for deployment away from said dynamically designed body and said canister spool is provided with an extension to guide said optical fiber away from said propulsor means.

5. An apparatus according to claim 3 in which said tether cable and said length of said optical fiber are spooled on said dynamically-designed body prior to the launch of said missile.

6. An apparatus according to claim 3 in which said tether cable and said length of said optical fiber are spooled on said launch platform prior to the launch of said missile.

7. An apparatus according to claim 3, 4, 5 or 6 in which said dynamically-designed body is configured to exert a tensile force on said tether cable to thereby prevent damage to said length of said optical fiber.

8. An apparatus according to claims 3, 4, 5 or 6 in which said dynamically-designed body is provided with flotation to thereby prevent damage to said length of said optical fiber.

9. An apparatus according to claim 7 in which said dynamically-designed body is provided with flotation to thereby prevent damage to said length of said optical fiber.

10. An apparatus according to claim 7 in which said missile is provided with a missile spool of said optical fiber to provide said continuous optical data path upon the launching of said missile from said missile canister.

11. An apparatus according to claim 8 in which said missile is provided with a missile spool of said optical fiber to provide said continuous optical data path upon the launching of said missile from said missile canister.

12. An apparatus according to claim 9 in which said missile is provided with a missile spool of said optical fiber to provide said continuous optical data path upon the launching of said missile from said missile canister.

13. An apparatus according to claim 2 in which said launch platform is a submarine.

14. An apparatus according to claim 13 in which said missile canister is provided with a propulsor means for deployment away from said dynamically designed body and said canister spool is provided with an extension to guide said optical fiber away from said propulsor means.

15. An apparatus according to claim 13 in which said tether cable and said length of said optical fiber are spooled on said dynamically-designed body prior to the launch of said missile.

16. An apparatus according to claim 13 in which said tether cable and said length of said optical fiber are spooled on said launch platform prior to the launch of said missile.

17. An apparatus according to claim 13, 14, 15 or 16 in which said dynamically-designed body is configured to exert a tensile force on said tether cable to thereby prevent damage to said length of said optical fiber.

18. An apparatus according to claims 13, 14, 15 or 16 in which said dynamically-designed body is provided with flotation to thereby prevent damage to said length of said optical fiber.

19. An apparatus according to claim 17 in which said dynamically-designed body is provided with flotation to thereby prevent damage to said length of said optical fiber.

20. An apparatus according to claim 17 in which said missile is provided with a missile spool of said optical fiber to provide said continuous optical data path upon the launching of said missile from said missile canister.

21. An apparatus according to claim 18 in which said missile is provided with a missile spool of said optical fiber to provide said continuous optical data path upon the launching of said missile from said missile canister.

22. An apparatus according to claim 19 in which said missile is provided with a missile spool of said optical fiber to provide said continuous optical data path upon the launching of said missile from said missile canister.

23. An apparatus according to claim 2 in which said launch platform is optionally a surface craft, submarine or aircraft.

24. An apparatus according to claim 23 in which said missile canister is provided with a propulsor means for deployment away from said dynamically designed body and said canister spool is provided with an extension to guide said optical fiber away from said propulsor means.

25. An apparatus according to claim 23 in which said tether cable and said length of said optical fiber are spooled on said dynamically-designed body prior to the launch of said missile.

26. An apparatus according to claim 23 in which said tether cable and said length of said optical fiber are spooled on said launch platform prior to the launch of said missile.

27. An apparatus according to claim 23, 24, 25 or 26 in which said dynamically-designed body is configured to exert a tensile force on said tether cable to thereby prevent damage to said length of said optical fiber.

28. An apparatus according to claims 23, 24, 25 or 26 in which said dynamically-designed body is provided with flotation to thereby prevent damage to said length of said optical fiber.

29. An apparatus according to claim 27 in which said dynamically-designed body is provided with flotation to thereby prevent damage to said length of said optical fiber.

30. An apparatus according to claim 27 in which said missile is provided with a missile spool of said optical fiber to provide said continuous optical data path upon the launching of said missile from said missile canister.

31. An apparatus according to claim 28 in which said missile is provided with a missile spool of said optical fiber to provide said continuous optical data path upon the launching of said missile from said missile canister.

32. An apparatus according to claim 29 in which said missile is provided with a missile spool of said optical fiber to provide said continuous optical data path upon the launching of said missile from said missile canister.

* * * * *